United States Patent
Choi et al.

(10) Patent No.: US 9,013,129 B2
(45) Date of Patent: Apr. 21, 2015

(54) REGENERATIVE INVERTER DEVICE AND INVERTER DEVICE USING POWER CELL UNIT

(71) Applicant: LSIS Co., Ltd., Anyang-si, Gyeonggi-do (KR)

(72) Inventors: Seung Cheol Choi, Anyang-si (KR); Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 112 days.

(21) Appl. No.: 14/012,442

(22) Filed: Aug. 28, 2013

(65) Prior Publication Data

US 2014/0062354 A1   Mar. 6, 2014

(30) Foreign Application Priority Data

Sep. 5, 2012  (KR) .......................... 10-2012-0098496

(51) Int. Cl.
| | |
|---|---|
| H02P 27/00 | (2006.01) |
| H02M 5/458 | (2006.01) |
| H02P 6/14 | (2006.01) |
| H02M 7/49 | (2007.01) |

(52) U.S. Cl.
CPC ............. *H02M 5/4585* (2013.01); *H02P 27/00* (2013.01); *H02P 6/14* (2013.01); *H02M 7/49* (2013.01)

(58) Field of Classification Search
CPC ............. H02P 6/10; H02P 27/00; H02P 6/14; H02P 21/00; H02P 29/0038; H02M 5/4585; H02M 1/12; H02M 7/00
USPC .......... 318/400.3, 400.26, 722, 758, 812, 504
See application file for complete search history.

(56) References Cited

U.S. PATENT DOCUMENTS

| | | | | |
|---|---|---|---|---|
| 6,777,907 | B2 * | 8/2004 | Ho ................................ | 318/801 |
| 8,629,637 | B2 * | 1/2014 | Blasko et al. ................. | 318/376 |
| 8,754,602 | B2 * | 6/2014 | Bonvin et al. ............ | 318/400.23 |
| 8,816,616 | B2 * | 8/2014 | Costanzo et al. ........ | 318/400.02 |
| 2014/0191699 | A1 * | 7/2014 | Dixon ........................... | 318/503 |

FOREIGN PATENT DOCUMENTS

| | | |
|---|---|---|
| JP | 03-104093 | 5/1991 |
| JP | 8-317638 | 11/1996 |
| JP | 10-164846 | 6/1998 |
| JP | 2005-295623 | 10/2005 |
| JP | 2006-067754 | 3/2006 |
| JP | 2009-106081 | 5/2009 |
| JP | 2010-263775 | 11/2010 |

OTHER PUBLICATIONS

Japan Patent Office Application Serial No. 2013-182947, Office Action dated Jul. 29, 2014, 3 pages.

* cited by examiner

*Primary Examiner* — Bentsu Ro
*Assistant Examiner* — Thai Dinh
(74) *Attorney, Agent, or Firm* — Lee, Hong, Degerman, Kang & Waimey (57) ABSTRACT

An inverter device may include a converter unit configured to receive single phase AC power to output DC power; a capacitor unit configured to absorb the DC power; an inverter unit configured to synthesize the absorbed DC power to output the drive power of a load; and a converter controller configured to control the converter unit based on the AC power and the output DC power of the converter unit, wherein the converter controller includes a converter gate signal generator configured to control a plurality of gates contained in the converter unit; and an input line harmonic voltage generator configured to output converter additional power having a predetermined multiple of the frequency of the fundamental frequency component of the AC power with the same size as that of the fundamental frequency component of the AC power to an adder connected to the input side of the converter gate signal generator.

13 Claims, 10 Drawing Sheets

REGENERATIVE INVERTER DEVICE AND INVERTER DEVICE USING POWER CELL UNIT

CROSS-REFERENCE TO RELATED APPLICATIONS

Pursuant to 35 U.S.C. §119(a), this application claims the benefit of earlier filing date and right of priority to Korean Application No. 10-2012-0098496, filed on Sep. 5, 2012, the contents of which is incorporated by reference herein in its entirety.

BACKGROUND OF THE INVENTION

1. Field of the Invention

The present disclosure relates to a regenerative inverter device and an inverter device using a unit power cell, and more particularly, to a regenerative inverter device and an inverter device using a unit power cell capable of achieving the volume and cost reduction of a system through DC-link voltage pulsation improvement in a regenerative inverter device and an inverter device using a unit power cell.

2. Description of the Related Art

A high voltage inverter may denote an inverter having input power with a line-to-line voltage root-mean-square (RMS) value above 600 V. Such a high voltage inverter is mainly used in the application field such as a fan, a pump, a compressor or the like.

In a high voltage inverter used in the application field, a variable speed operation frequently occurs, and thus a regenerating operation using a regenerative inverter is used when fast acceleration or fast deceleration operation is required, thereby supporting fast acceleration or fast deceleration. Furthermore, for example, such a regenerating operation is essentially required for application fields such as traction, hoist, conveyor, and the like.

Figure 1:
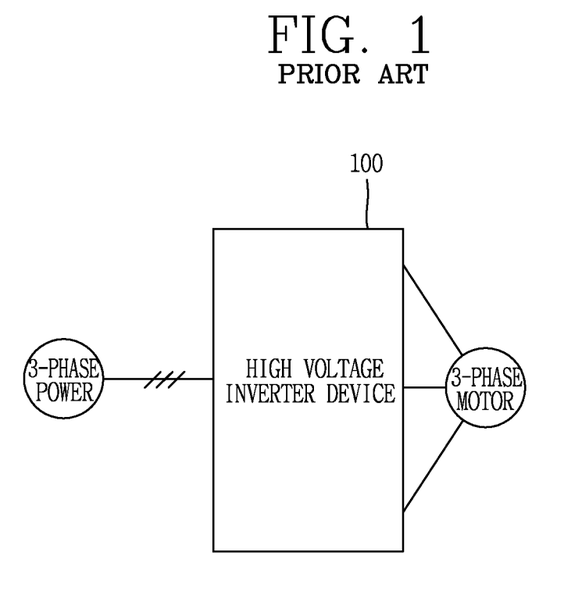
FIGS. 1 through 5 are views for explaining the configuration and operation of a typical inverter device.

FIG. 1 illustrates a connection configuration of a typical high voltage inverter device.

There are various kinds of high voltage inverters, but for an example of a high voltage inverter driven by unit power, as illustrated in FIG. 1, the high voltage inverter 100 receives 3-phase power to replace the phase, and enhances the harmonic distortion ratio of the power current, and then generates unit power through a transformer, and synthesizes the unit power into a 3-phase voltage to supply it to a 3-phase motor according to each phase.

Figure 2:
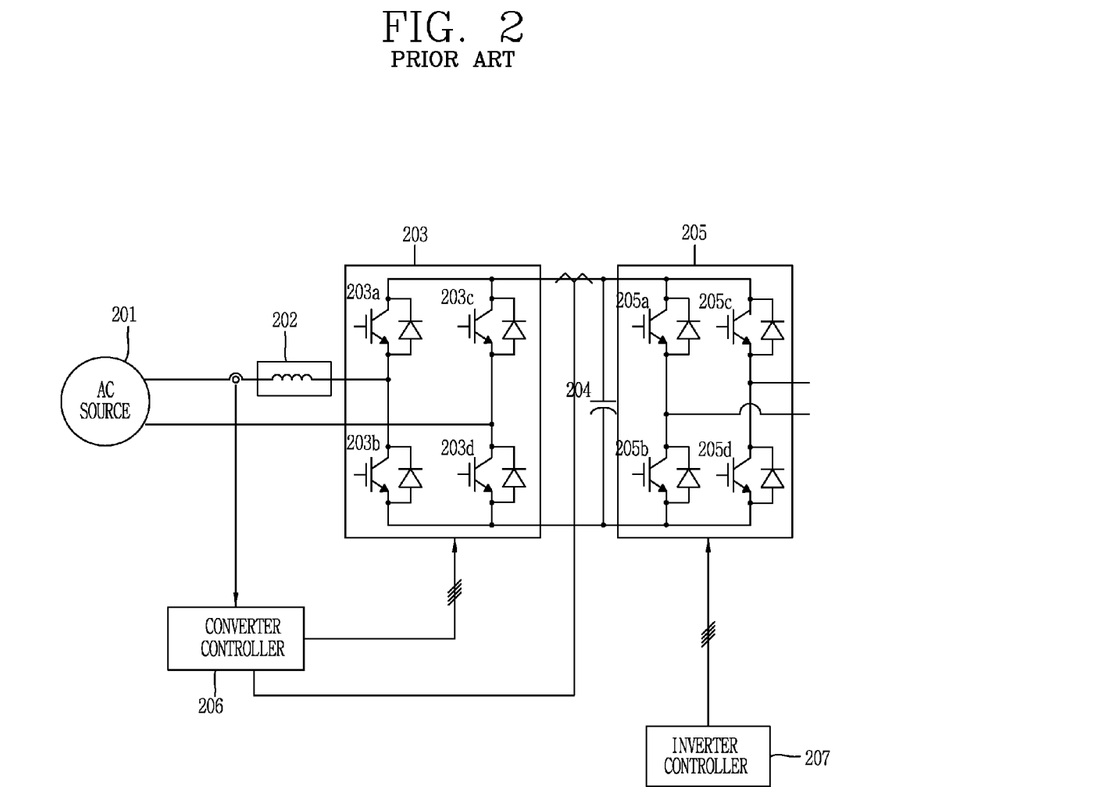

FIG. 2 illustrates a unit power cell configuration of the high voltage inverter 100.

Each unit power cell may include an inductor 202 for receiving AC power from an input power unit 201 to store and supply the power, a converter 203 for converting power passed through the inductor 202 to DC power, a converter controller 206 for controlling the converter 203, a capacitor 204 for absorbing the input/output power of the converter 203, an inverter 205 for converting the DC power to AC power again, and an inverter controller 207 for controlling the inverter 205.

A unit power cell included in the inverter device 100 receives single phase power to supply a phase voltage. The specific operation thereof is carried out according to the switching control of the converter controller 206 and inverter controller 207, and the detailed operation thereof may be described with reference to Chapter 7, Bin Wu, High-Power Converters and AC Drive, Wiley-Science.

Figure 3:
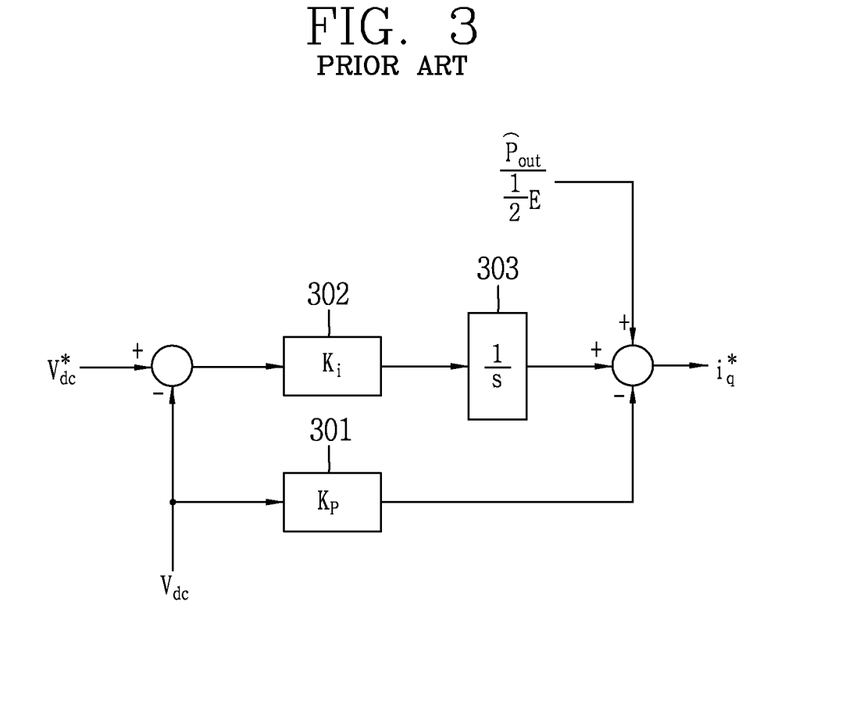
Figure 4:
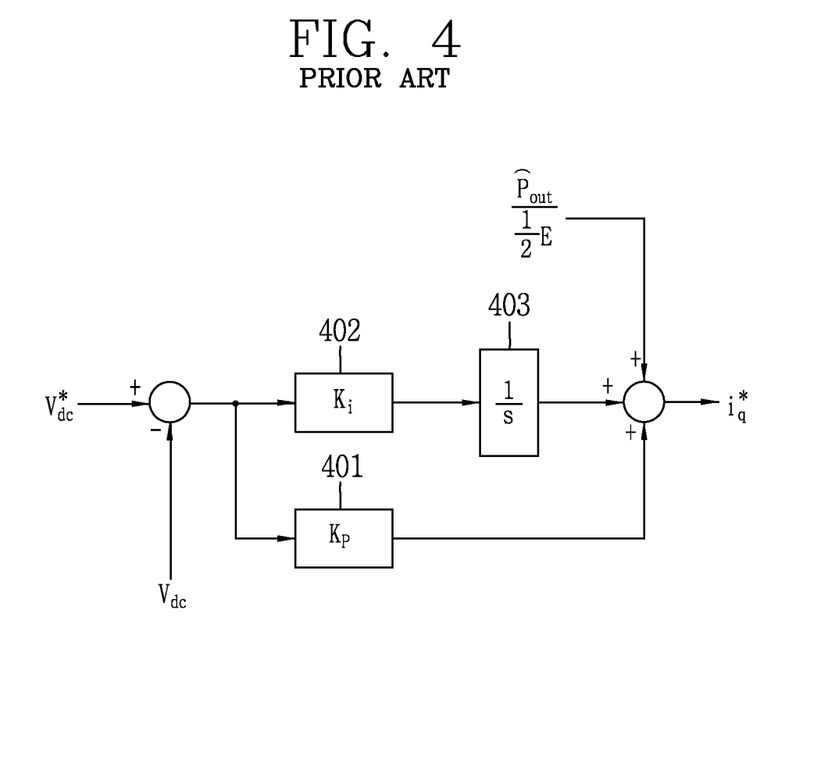

More specifically, the converter controller 206 is an output port of the converter 203 to control a DC line voltage connected to the capacitor 204. In general, the capacitor 204 is used to resolve power imbalance in the input/output ports, and the DC line voltage is increased when input power supplied from the power source side is greater than output power consumed at the load, and the DC line voltage is decreased in the opposite case to perform an absorption operation. FIGS. 3 and 4 illustrate a DC line voltage controller configurations of the converter controller 206 for controlling a DC line voltage.

A typical DC line voltage controller may be selectively configured according to the application field in the form of an integral proportional controller as illustrated in FIG. 3 or an proportional integral controller as illustrated in FIG. 4.

In each drawing, Kp denotes a proportional gain, Ki denotes an integral gain, Vdc may represents a measurement value of a DC line voltage outputted to the capacitor 204, and Vdc* represents a DC line voltage control command signal value.

Based on a dq coordinate system current, a q-axis current command signal iq* acquired in FIG. 3 may be calculated as in Equation 1, and a q-axis current command signal iq* acquired in FIG. 4 may be calculated as in Equation 2.

$$i_q^{e*} = -K_p v_{dc} + K_i \int (v_{dc}^* - v_{dc}) dt + \frac{\hat{P}_{out}}{\frac{1}{2}E} \qquad \text{[Equation 1]}$$

$$i_q^{e*} = K_p (v_{dc}^* - v_{dc}) + K_i \int (v_{dc}^* - v_{dc}) dt + \frac{\hat{P}_{out}}{\frac{1}{2}E} \qquad \text{[Equation 2]}$$

As described above, the voltage of the capacitor 204 connected to a DC line may be controlled by a DC line voltage controller, and the output of the DC line voltage controller may be a q-axis current command signal (iq*). The current controller of the second portion 206 controls d, q-axis currents, respectively, in the synchronous coordinate system according to the current command signal, wherein the q-axis current component is referred to as an effective power current and d-axis current component is defined as an ineffective power current.

An AC power line power factor may be controlled according to the operation of the current controller of the second portion 206 when the need arises. When the power voltage and current are sinusoidal waves, the power factor (PF) may be expressed as follows.

$$PF = \frac{e_{dq}^e \cdot i_{dq}^e}{|e_{dq}^e||i_{dq}^e|} \qquad \text{[Equation 3]}$$

$$= \frac{i_q^e}{\sqrt{i_d^{e2} + i_q^{e2}}}$$

Here, edq^e=ed^e+jeq^e, idq^e=id^e+jiq^e, and edq^e·idq^e denotes an inner product of a power voltage complex vector and a current complex vector in the synchronous coordinate system, and |edq^e||idq^e| may denote a product of each complex vector size. A synchronous coordinate system d-axis current command signal value id^e* for controlling a power factor output from the DC line voltage controller may be expressed as follows from Equation 3.

$$i_d^* = i_q^* \frac{\sqrt{1-PF^{*2}}}{PF^*}$$ [Equation 4]

Figure 5:
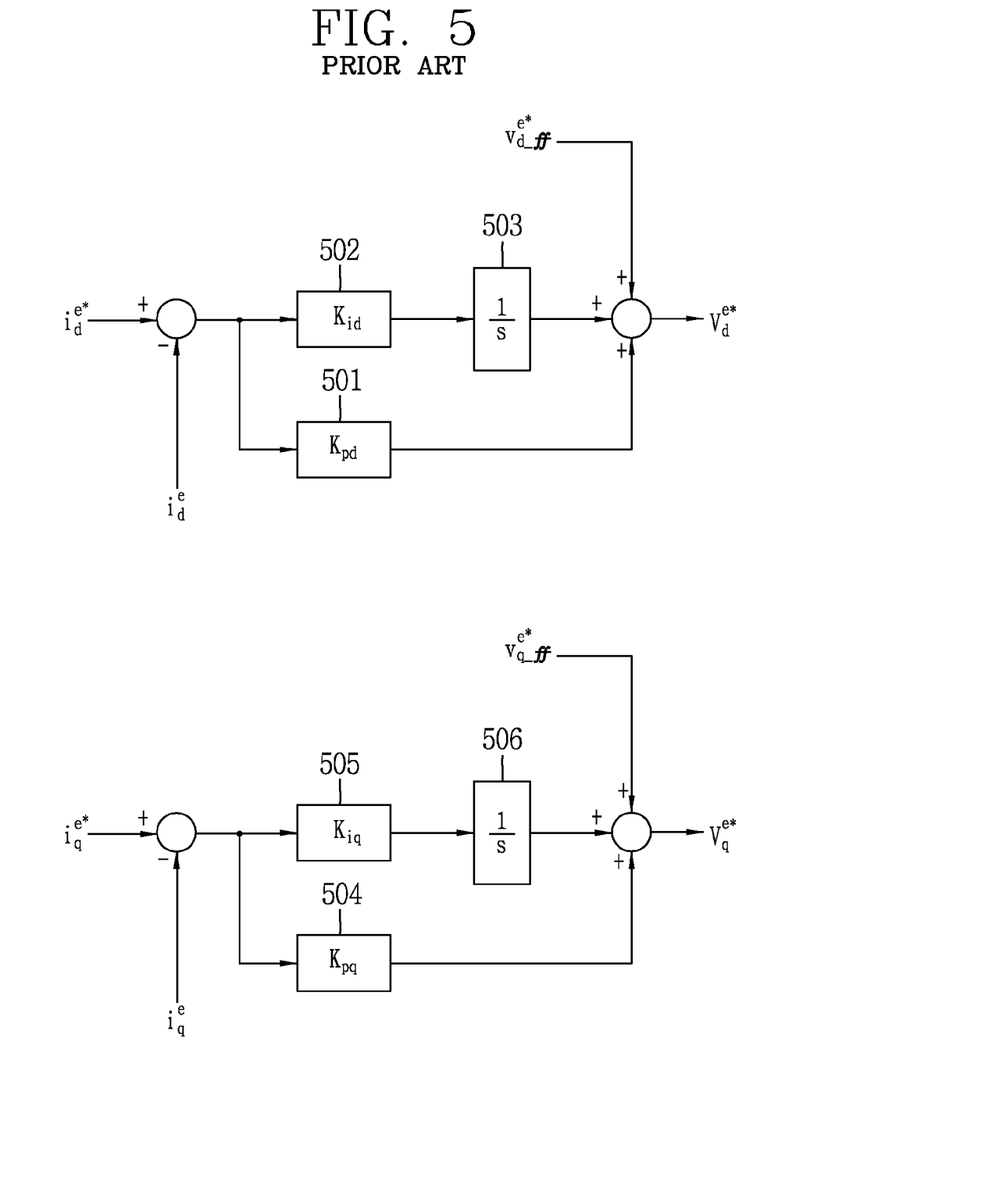

On the other hand, the current controller of the second portion 206 may be configured as illustrated in FIG. 5. The current controller may output a voltage command signal using a proportional integral controller and a feed forward compensator according to a current command signal calculated through power factor control outputted from the foregoing DC line voltage controller and a current measured through the current sensor.

In FIG. 5, Kpd and Kpq may denote a proportional gain value to a d-axis current command signal and a proportional gain value to a q-axis current command signal, respectively, and Kid and Kiq may denote an integral value to a d-axis current command signal and an integral value to a q-axis current command signal, respectively.

A voltage command signal value outputted by the current controller in FIG. 5 is as follows.

$$v_q^{e*} = K_p(i_q^{e*} - i_q^e) + K_i \int (i_q^{e*} - i_q^e) dt + v_{q\_ff}^{e*}$$

$$v_d^{e*} = K_p(i_d^{e*} - i_d^e) + K_i \int (i_d^{e*} - i_d^e) dt + v_{d\_ff}^{e*}$$

$$v_{q\_ff}^{e*} = -\omega_e L_{inter} i_q^e$$

$$v_{d\_ff}^{e*} = \omega_e L_{inter} i_d^e$$ [Equation 5]

The generated voltage command signal may be converted and output to a single phase stationary coordinate system to be used in the converter 203.

On the other hand, the voltage pulsation of a unit power cell including the second portion 206 can be obtained as follows.

First, the input voltage and current of the unit power cell may be expressed as Equation 6.

$$v_s(t) = \sqrt{2} V_s \sin(\omega_s t)$$

$$i_s(t) = \sqrt{2} I_s \sin(\omega_s t + \delta)$$ [Equation 6]

In Equation 6, δ is a phase difference between the input voltage and current of the converter 203, and $\omega_s$ is an input power frequency, t is a time, and $V_s$ and $I_s$ are input voltage and current root-mean-square (RMS) values.

Furthermore, input power $p_s(t)$ obtained from Equation 6 is as follows.

$$p_s(t) = v_s(t) i_s(t) = V_s I_s [\cos(\delta) - \cos(2\omega_s t + \delta)]$$ [Equation 7]

In this case, the output voltage and current of each unit power cell may be defined as Equation 8.

$$v_0(t) = \sqrt{2} V_0 \sin \omega_o t$$

$$i_0(t) = \sqrt{2} I_0 \sin(\omega_o t + \phi)$$ [Equation 8]

Here, φ may denote a load angle, $\omega_o$ may denote an operating frequency, and t may denote a time. Furthermore, $V_0$ and $I_0$ may denote output voltage and current root-mean-square (RMS) values.

From Equation 8, the output power of the unit power cell may be computed as Equation 9.

$$p_o(t) = v_0(t) i_0(t) = V_0 I_0 \cos \phi - V_0 I_0 \cos(2\omega_o t + \phi)$$ [Equation 9]

As shown in Equation 9, it is seen that the input and output power of the unit power cell is comprised of a DC component and an AC component, and it is seen that the AC component of the input power has two times of the input frequency and the AC component of the output power has two times of the operating frequency.

Power transferred to the capacitor 204 connected to the DC line may be determined by a difference between the input power and output power of the converter 203. Furthermore, since the average values of the input power and output power should be the same, the remaining AC component may be power transferred to the capacitor 204. It may be expressed as Equation 10 below.

$$p_c = p_s(t) - p_o(t) = V_s I_s \cos(2\omega_s t + \delta) - V_0 I_0 \cos(2\omega_o t + \phi)$$ [Equation 10]

From Equation 10, it is seen that pulsations corresponding to two times of the input frequency and operating frequency are generated at the DC line, respectively, and it is seen that the pulsating size of the DC line power voltage is increased when the AC component of the input power and output power is increased.

Accordingly, pulsations corresponding to two times of the input line power frequency and output line operating frequency are generated in a large scale at the DC line voltage (capacitor 204 transfer voltage) of a power circuit comprised of the single phase converter 203 and inverter 205 of the unit power cell, and thus the capacitance of a DC line capacitor for reducing them may be required in a large scale. It increases the volume and cost of the entire system. Furthermore, the pulsation of the DC line voltage exerts an effect on the inverter output voltage, thereby reducing system reliability.

SUMMARY OF THE INVENTION

An object of the present disclosure is to provide a regenerative inverter device capable of reducing the DC line voltage pulsation of the inverter and an inverter device using a unit power cell.

Furthermore, another object of the present disclosure is to provide a regenerative inverter device capable of reducing the capacitance of a DC line capacitor of the inverter and an inverter device using a unit power cell.

In addition, still another object of the present disclosure is to provide a regenerative inverter device capable of enhancing the system reliability of the inverter output through the active voltage control of a unit power cell and an inverter device using the unit power cell.

In order to accomplish the foregoing objects, an inverter device according to an embodiment of the present invention may include a converter unit configured to receive single phase AC power to output DC power; a capacitor unit configured to absorb DC power being output from the converter unit; an inverter unit configured to synthesize the absorbed DC power to output the drive power of a load; and a converter controller configured to control the converter unit based on the single phase AC power and the output DC power of the converter unit, wherein the converter controller includes a converter gate signal generator configured to control a plurality of gates contained in the converter unit; and an input line harmonic voltage generator configured to output converter additional power having a predetermined multiple of the frequency of the fundamental frequency component of the single phase AC power with the same size as that of the fundamental frequency component of the single phase AC power to an adder connected to the input side of the converter gate signal generator.

Preferably, the converter controller may include a phase detection unit configured to detect the phase information of the single phase AC power; a coordinate conversion unit configured to convert a current of the single phase AC power to a d-axis current and a q-axis current according to the dq synchronous coordinate system based on the detected phase information; a voltage controller configured to generate a d-axis control current and a q-axis control current according to the output voltage of the converter unit; and a current controller configured to generate a first control voltage for controlling the converter unit according to the coordinate converted d-axis current and q-axis current and the d-axis control current and q-axis control current being output from the voltage controller, wherein the input line harmonic voltage generator outputs a second control voltage based on the single phase AC power and the first control voltage, and the adder adds the first control voltage and the second control voltage to output it to the converter gate signal generator.

Preferably, the input line harmonic voltage generator may include a subtractor configured to output a difference between the first control voltage and the single phase power voltage; an absolute value computing unit configured to calculate an absolute value of the subtractor output to compute the size of the fundamental frequency component; a proportional controller configured to output a predetermined size of the harmonic voltage based on the computed size of the fundamental frequency component; and a phase determination unit configured to control a phase such that a harmonic voltage being output from the proportional controller becomes the predetermined multiple of the fundamental frequency to output the second control voltage.

Preferably, the input line harmonic voltage generator may include a proportional controller for maintaining the voltage size and frequency of the converter additional power at the predetermined multiple.

Preferably, the predetermined multiple may be 3 times.

Furthermore, in order to accomplish the foregoing objects, an inverter device according to an embodiment of the present invention may further include an inverter controller configured to control the inverter unit based on the output voltage of the inverter unit, wherein the inverter controller includes an inverter gate signal generator configured to control a plurality of gates contained in the inverter unit; and an output line harmonic voltage generator configured to output inverter additional power having a predetermined multiple of the frequency of the fundamental frequency component of the output voltage of the inverter unit with the same size as that of the fundamental frequency component of the output voltage of the inverter unit to an adder connected to the input side of the inverter gate signal generator.

Preferably, a predetermined multiple of the fundamental frequency component of the single phase AC power of the converter additional power frequency may be the same as that of the fundamental frequency component of the output voltage of the inverter unit of the inverter additional power frequency.

Preferably, the output line harmonic voltage generator may include an absolute value computing unit configured to compute a fundamental frequency component size of the output voltage of the inverter unit; and a phase determination unit configured to output the inverter additional power through phase control based on a load angle of the output voltage of the inverter unit and a fundamental frequency component size of the output voltage of the inverter unit.

Furthermore, in order to accomplish the foregoing objects, there is provided an inverter device comprising a plurality of unit power cells, and the inverter device may include a phase replacement transformer unit configured to receive 3-phase power from input power to perform phase replacement, and provide single phase power to the each unit power cell; and an output line configured to synthesize power output from the each unit power cell to output it to a 3-phase drive load, wherein the each unit power cell includes a converter unit configured to receive the single phase power to output DC power; an inverter unit configured to output the DC power to the output line; a converter controller configured to control the converter unit based on the single phase power and the output power of the converter unit; and an inverter controller configured to control the inverter unit based on the output voltage of the inverter unit, wherein the converter controller comprises an input line harmonic voltage generator configured to output converter additional power having a predetermined multiple of the frequency of the fundamental frequency component of the single phase AC power with the same size as that of the fundamental frequency component of the single phase power, and the inverter controller comprises an input line harmonic voltage generator configured to output converter additional power having a predetermined multiple of the frequency of the fundamental frequency component of the output voltage with the same size as that of the fundamental frequency component of the output voltage.

Preferably, the each unit power cell may use a unit power cell divided into a predetermined group corresponding to each phase of the 3-phase drive load to be connected to the output line.

Preferably, the phase voltage of the 3-phase drive load may use a unit power cell synthesized into the voltage sum of unit cells divided into the predetermined group.

Preferably, the inverter unit and the converter unit contained in the each unit power cell may use a unit power cell connected in a series H-bridge structure.

Preferably, the 3-phase drive load may use a unit power cell containing at least one of an induction motor and a synchronous motor.

According to an embodiment of the present invention, a pulsating power frequency may be increased using an input line harmonic voltage generator, thereby reducing the pulsating size of the DC line voltage of the converter.

Furthermore, according to an embodiment of the present invention, a pulsating power frequency may be increased using an input line harmonic voltage generator and an output line harmonic voltage generator, thereby reducing the pulsating size of the DC line voltage of the converter.

Furthermore, the capacitance of the DC line capacitor may be reduced due to the reduction of a pulsating size of the DC line voltage of the converter, thereby reducing the volume and cost of the entire system.

In addition, it may be possible to have an effect capable of enhancing system reliability through the reduction of a pulsating size of the DC line voltage of the converter

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The following description illustrates the principles of the present invention. It will thus be appreciated that those skilled in the art will be able to devise various devices that, although not explicitly described or shown herein, embody the principles of the invention and are included in the spirit and scope of the present invention. Furthermore, all conditional terms and embodiments recited herein are intended only for pedagogical purposes to aid the reader in understanding the principles of the invention, and are to be construed as being without limitation to such specifically recited embodiments and conditions.

Moreover, all detailed description herein reciting the principles, aspects, and embodiments of the invention as well as specific embodiments thereof are intended to encompass both structural and functional equivalents thereof. Additionally, it is intended that such equivalents include both currently known equivalents as well as equivalents to be developed in the future, i.e., any elements developed to perform the same function regardless of its structure.

Thus, for example, it will be appreciated by those skilled in the art that the block diagrams presented herein represent the conceptual view of an exemplary circuit that embodies the principles of the invention. Similarly, it will be appreciated that any flow charts, flow diagrams, state transition diagrams, pseudocodes, and the like represent various processes which may be substantially represented in computer readable media and so executed by a computer or processor, whether or not such a computer or processor is explicitly shown.

The foregoing objects, features and advantages will be more obvious through the following detailed description associated with the accompanying drawings, and accordingly, the technological concept of the present invention can be easily implemented by a person having ordinary skill in the art to which the present invention pertains. In describing the present invention, moreover, the detailed description will be omitted when a specific description for publicly known technologies to which the invention pertains is judged to obscure the gist of the present invention.

Hereinafter, a preferred embodiment according to the present invention will be described in detail with reference to the accompanying drawings.

Figure 6:
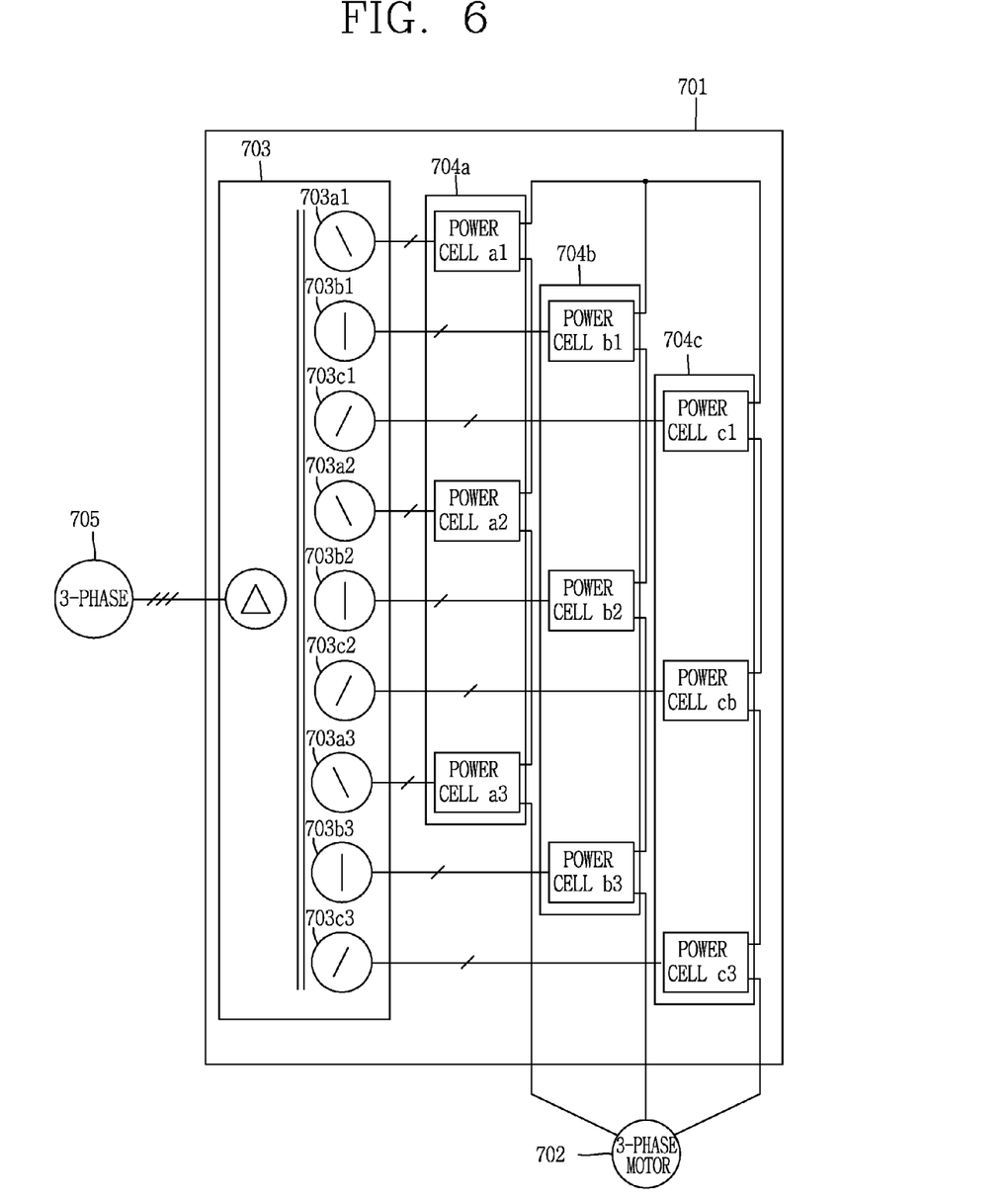
FIG. 6 is a view schematically illustrating an example of an entire system including an inverter device according to an embodiment of the present invention.

FIG. 6 is a view schematically illustrating an example of an entire system including an inverter device according to an embodiment of the present invention.

Referring to FIG. 6, an entire system including the inverter device 701 according to an embodiment of the present invention may include a power input unit 705, a phase replacement transformer unit 703, a plurality of unit power cells (a1 to c3) and a 3-phase motor 702.

The power input unit 705 receives 3-phase voltage from a power supplier to transfer it to the phase replacement transformer unit 703. In case of a high voltage inverter, the power input unit 705 may receive and transfer a 3-phase voltage having a line-to-line voltage root-mean-square (RMS) value above 600 V.

The phase replacement transformer unit 703 reduces the harmonics of the transfer power of the power input unit 705 received from the input line to enhance the total harmonic distortion of the power current, and performs the transformation process to provide single phase power to each unit power cell. Furthermore, the phase replacement transformer unit 703 may provide electrical insulation between the input line of the power input unit 705 and the inverter device 701.

Furthermore, each unit power cell (a1 to c3) receives single phase power to output a phase voltage. The phase voltage is synthesized into a voltage sum of unit power cells corresponding to each phase to be output to the 3-phase motor 702.

Accordingly, unit power cells can be grouped. For example, the unit power cell group 704a may include unit power cells (a1, a2, a3), and the output of unit power cells contained in the unit power cell group 704a may be synthesized to correspond to one phase, thereby outputting single phase power to the 3-phase motor. Furthermore, a voltage phase between each unit power cell (704a to 704c) may have a phase difference of 120 degrees for forming the 3-phase power.

Hereinafter, the configuration of a single phase power cell in an inverter device according to an embodiment of the present invention will be described in more detail with reference to FIGS. 7 through 11.

Figure 7:
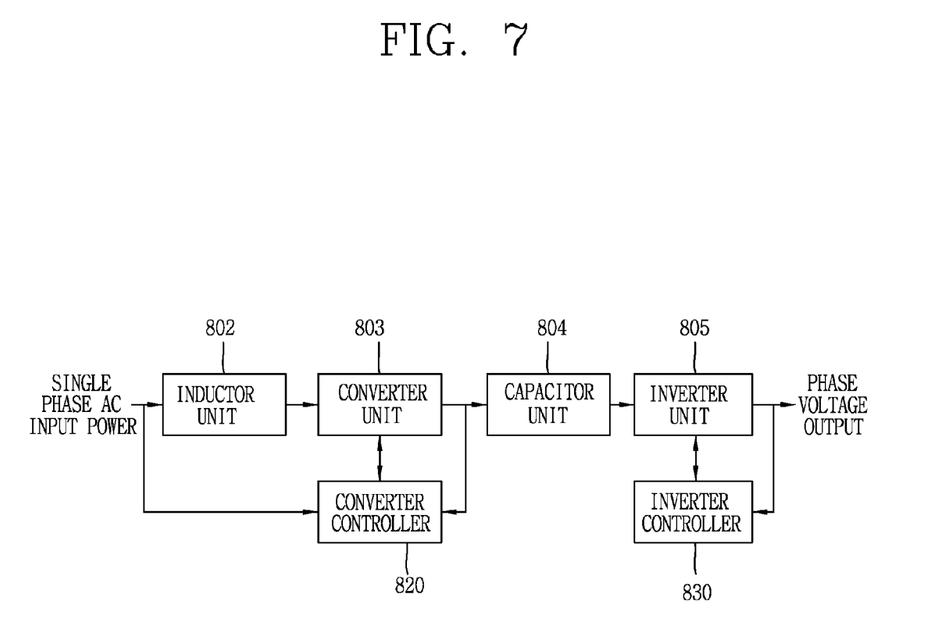
FIG. 7 is a block diagram illustrating the configuration of an inverter device according to an embodiment of the present invention.

FIG. 7 is a block diagram illustrating the configuration of a unit power cell in an inverter device according to an embodiment of the present invention.

Referring to FIG. 7, an inverter device according to an embodiment of the present invention may include an inductor unit 802 configured to receive single phase AC power for storage and transfer; a converter unit 803 configured to convert and boost the output of the inductor unit 802 into DC power for output; an inverter unit 805 configured to convert the boosted DC power again to output AC power; a converter controller 820 configured to control the converter unit 803 based on the single phase AC power and the output power of the converter unit 803; and an inverter controller 830 configured to control the inverter unit 805 based on the output voltage of the inverter unit 805.

Furthermore, the converter controller 820 may include an input line harmonic voltage generator configured to output converter additional power having a predetermined multiple of the frequency of the fundamental frequency component of the single phase AC power with the same size as that of the fundamental frequency component of the single phase power.

Furthermore, the inverter controller 830 may include an output line harmonic voltage generator configured to output inverter additional power having a predetermined multiple of the frequency of the fundamental frequency component of the output voltage with the same size as that of the fundamental frequency component of the output voltage of the inverter unit.

The pulsation of the DC voltage being output from the converter unit 803 may be reduced according to the operation of the converter controller 820 and inverter controller 830. The more detailed description thereof will be described later.

Figure 8:
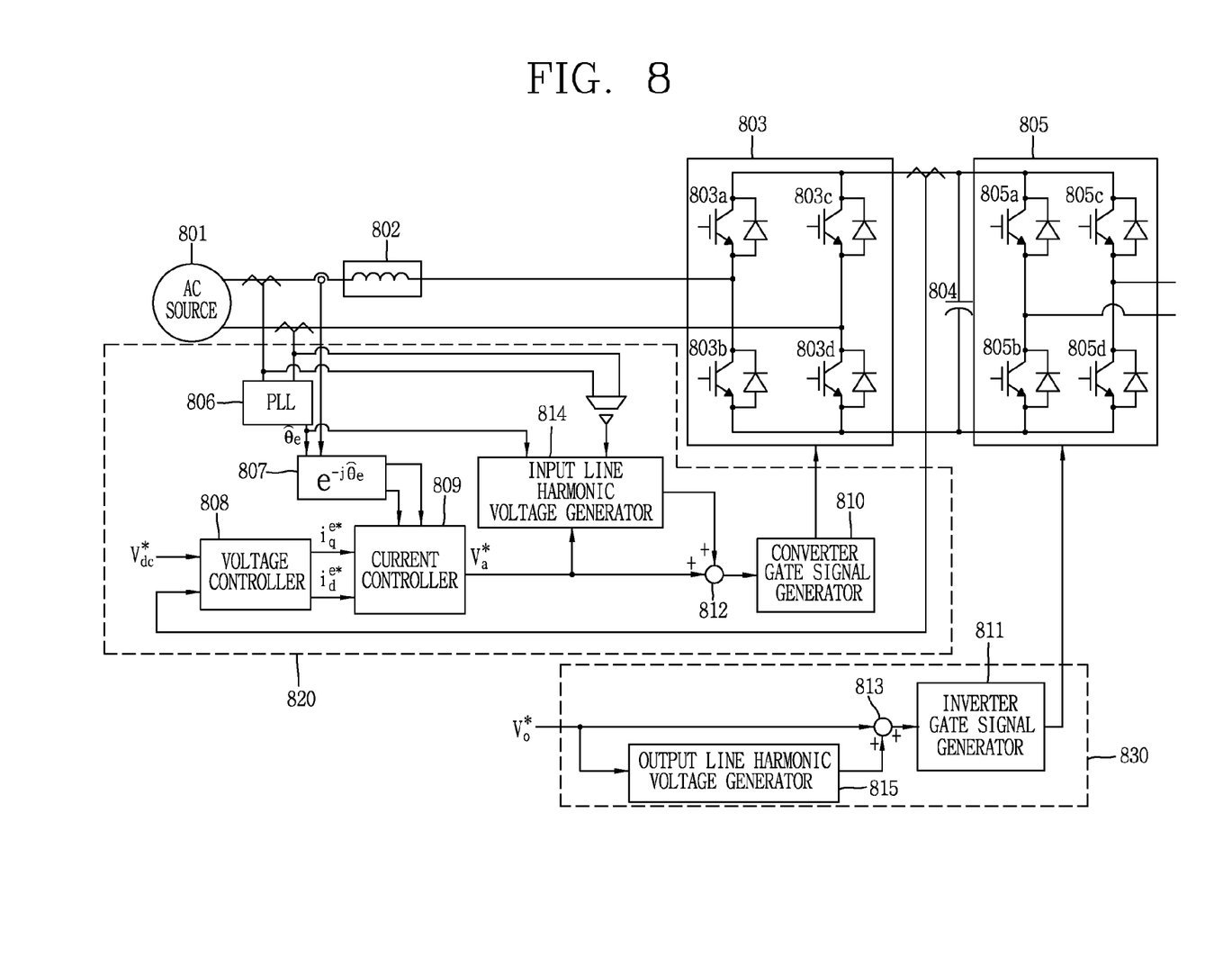
FIG. 8 is a view illustrating the configuration of a unit power cell in an inverter device according to an embodiment of the present invention.

FIG. 8 is a view more specifically illustrating the configuration of a unit power cell in an inverter device according to an embodiment of the present invention.

Furthermore, referring to FIG. 8, the other configurations are the same as described in FIG. 7, and the configuration of the converter controller 820 and inverter controller 830 will be described below in more detail.

First, the converter controller 820 may include a phase detection unit 806, a coordinate conversion unit 807, a voltage controller 808, a current controller 809, a input line harmonic voltage generator 814, a first adder 812, and a converter gate signal generator 810.

The phase detection unit 806 may be connected to the input power 801 of the unit power cell to measure the voltage of the single phase power received from the input power 801 and acquire phase information and provide it to the coordinate conversion unit 807.

The coordinate conversion unit 807 may be connected to the phase detection unit 806 and the input power 801 of the unit power cell. The coordinate conversion unit 807 may convert a current of the input power 801 of the unit power cell transmitted on the single phase stationary coordinate system to a current on the dq synchronous coordinate system based on phase information received from the phase detection unit 806.

The voltage controller 808 may generate a current control command signal according to a DC line voltage which is an output line of the converter unit 803, and output it to the current controller 809. The voltage controller 808 may generate d, q-axis control currents (iq*, id*) on the synchronous coordinate system based on a voltage measured from the DC voltage of the output line of the converter unit 803 and a DC voltage command signal (Vdc*). The DC voltage command signal may be received from the user, or may be received from a main control system, or may be previously set to a value. In addition, the voltage controller 808 may further include a bandpass filter configured to output only a current command signal having a fundamental frequency component.

According to an embodiment of the present invention, the voltage command or current command signal may indicate a control voltage or control current having a specific value for voltage or current control. According to the convenience, each control voltage or control current may be referred to as a current command signal or voltage command signal.

The current controller 809 may be connected to the voltage controller 808 and coordinate conversion unit 807. The current controller 809 may receive a current command signal applied from the voltage controller 808. Furthermore, the current controller 809 may generate a voltage command signal based on the received current command signal and the coordinate converted current from the coordinate conversion unit 807, and output the generated voltage command signal (Va*).

The converter gate signal generator 810 may generate a switching signal for each power element in the converter unit 803, particularly, a plurality of switches (803a and 803d) contained in the converter unit 803, and receive it at the converter unit 803. The converter gate signal generator 810 may be connected to the first adder 812. The converter gate signal generator 810 may receive a voltage command signal for which the output signal of the input line harmonic voltage generator 814 is added to the output of the current controller 809 through the first adder 812, thereby generating a PWM signal to control the switching operation of the converter unit 803.

The first adder 812 adds the output signal of the input line harmonic voltage generator 814 to the output signal of the current controller 809, and the resultant signal is transferred to the foregoing gate signal generator 810.

Furthermore, the input line harmonic voltage generator 814 outputs converter additional power having a predetermined multiple of the frequency of the fundamental frequency component of the single phase AC power with the same size as that of the fundamental frequency component of the single phase AC power to the first adder 812 connected to the input side of the converter gate signal generator 810. Through this, it may be possible to reduce the pulsation of the output DC line power of the converter unit 803, and decrease the size of the capacitor unit 804. The detailed configuration for the operation of the input line harmonic voltage generator 814 will be described later.

On the other hand, the inverter controller 830 may include an inverter gate signal generator 811, a second adder 813, and an output line harmonic voltage generator 815.

The inverter gate signal generator 811 may receive an output voltage command signal through the adder 813. The inverter gate signal generator 811 may generate a switching signal for controlling a plurality of power elements, particularly, a plurality of switching elements (805a to 805d) contained in the inverter unit 805, and receive it at each switch of the inverter unit 805.

The second adder 813 may output a signal to which a command signal voltage (Vo*) for the output voltage of the output line harmonic voltage generator 815 and inverter unit 805 are added to the inverter gate signal generator 811. The command signal voltage for the output voltage of the inverter unit 805 may include the output voltage of the inverter unit 805 as it is according to the generative inverter scheme. However, the command signal voltage may be set by the user according to the need, and may be of course determined according to the control of the control system when connected to another control system.

The output line harmonic voltage generator 815 may output inverter additional power having a predetermined multiple of the frequency of the fundamental frequency component of the output voltage of the inverter unit 805 with the same size as that of the fundamental frequency component of the output voltage of the inverter unit 805 to the second adder 813 connected to the input side of the inverter gate signal generator 811. Accordingly, the output frequency may be increased to further reduce the pulsation of the output DC line power of the converter unit 803, and further decrease the size of the capacitor unit 804. The detailed configuration for the operation of the output line harmonic voltage generator 815 will be described later.

Figure 9:
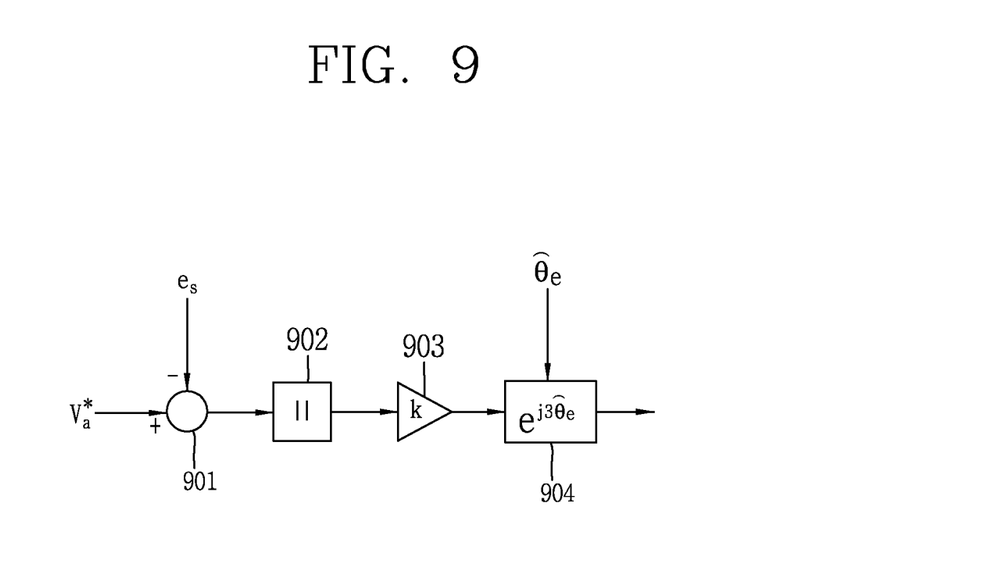
FIG. 9 is a control diagram for explaining the operation of an input line harmonic voltage generator in an inverter device according to an embodiment of the present invention.

FIG. 9 is a view illustrating the configuration of the input line harmonic voltage generator 814 according to an embodiment of the present invention.

Referring to FIG. 9, the input line harmonic voltage generator 814 according to an embodiment of the present invention may include a first subtractor 901, a first absolute value computing unit 902, a first proportional controller 903, and a first coordinate conversion unit 904.

The first subtractor 901 computes a difference between the voltage command signal (Va*) being output from the current controller 809 and the input voltage of the signal phase AC power 801, and outputs it to the first absolute value computing unit 902.

The first absolute value computing unit 902 may receive the output of the first subtractor 901, and computes the absolute value to output a signal to the first proportional controller 903. The absolute value computed by the first absolute value computing unit 902 may indicate the size of the fundamental frequency component of the converter voltage applied to the input winding of the converter unit 803.

The first proportional controller 903 may output a harmonic voltage for which the size is proportionally controlled to the first coordinate conversion unit 904 based on an absolute signal indicating the size of the fundamental frequency component of the converter voltage received from the first absolute value computing unit 902. A proportional constant may be "K", for example, and the "K" value may be determined such that the output of the first proportional controller 903 can be maintained at a predetermined multiple of the size of the fundamental frequency component of the converter voltage.

The first coordinate conversion unit 904 may be connected to the phase detection unit 806 to receive power phase angle information being output from the phase detection unit 806. Furthermore, the first coordinate conversion unit 904 may determine a harmonic voltage phase corresponding to three times of the fundamental frequency according to a harmonic voltage signal being output from the proportional controller 903, and convert the phase and coordinate of a harmonic voltage signal being output from the proportional controller 903 based on the determined voltage phase to output it to the first adder 812.

Figure 10:
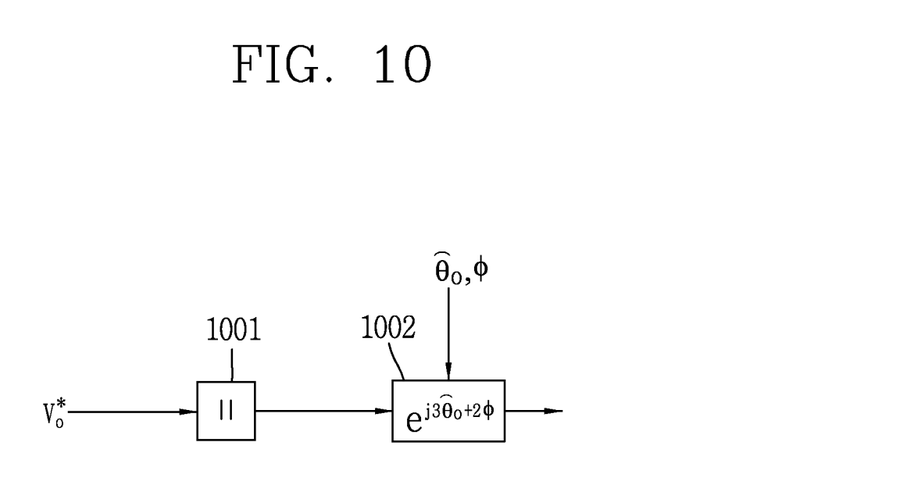
FIG. 10 is a control diagram for explaining the operation of an output line harmonic voltage generator in an inverter device according to an embodiment of the present invention.

FIG. 10 illustrates the configuration of the output line harmonic voltage generator 815 according to an embodiment of the present invention.

Referring to FIG. 10, the output line harmonic voltage generator 815 according to an embodiment of the present invention may include a second absolute value computing unit 1001 and a second coordinate conversion unit 1002.

The second absolute value computing unit 1001 may receive the output voltage of the inverter unit 805 being output from the inverter unit 805 as a voltage command (Vo*), and compute an absolute value of the received output voltage of the inverter unit 805 to output a signal to the second coordinate conversion unit 1002. The output absolute value signal may indicate the size of the fundamental frequency component of the output voltage of the inverter unit 805.

The second coordinate conversion unit 1002 may receive a voltage size signal being output from the second absolute value computing unit 1001, and determine a harmonic voltage phase corresponding to three times of the output voltage frequency of the inverter unit 805 based on the fundamental frequency component size of the output voltage of the inverter unit 805 and the load angle of a load connected to the output line of the inverter unit 805. Furthermore, the second coordinate conversion unit 1002 may convert the phase and coordinate of a harmonic voltage signal being output from the second absolute value computing unit 1001 based on the determined voltage phase to output it to the second adder 813.

The input and output power may be adjusted as follows according to the foregoing input line harmonic voltage generator 814 and output line harmonic voltage generator 815.

First, a voltage command required to increase the AC component frequency of the input power of the converter unit 803 may be generated according to the operation of the input line harmonic voltage generator 814. The voltage command may generate the same third harmonic current as the size of the fundamental frequency component of the power current, and to this end, the size of a voltage determining the size of the fundamental frequency current may be required. The size may be seen through Equation 11 which is a voltage equation of the input winding of the converter unit 803.

$$v_a(t) = R_s i_s + L_s \frac{di_s}{dt} + v_s(t) \qquad \text{[Equation 11]}$$

Here, va(t) may denote a voltage of the input winding of the converter unit 803.

According to Equation 11, it is seen that the size of a voltage exerting an effect on the current of the input power of the converter unit 803 is determined by a difference between the input voltage of the converter unit 803 and a voltage of the single phase input power (Vs).

Accordingly, the input line harmonic voltage generator 814 may apply a voltage having three times of the size and frequency of the fundamental frequency voltage exerting on a current flowing through the inductor unit 802 to the input winding through the converter unit 803, thereby flowing a current having a third harmonic component.

Furthermore, the input line harmonic voltage generator 814 may be controlled using a proportional controller in an accurate manner since the size of a voltage for flowing a current having the same third harmonic component as that of the fundamental frequency current can be changed according to the frequency or operating environment. The output voltage command of the input line harmonic voltage generator 814 may be added to an output voltage command of the current controller 809. Here, the input voltage, current and power of the converter unit 803 may be expressed as illustrated in Equation 12.

$$v_s(t) = \sqrt{2} V_s \sin(\omega_s t)$$

$$i_s(t) = \sqrt{2} I_s \sin(\omega_s t + \delta) + \sqrt{2} I_s \sin(3\omega_s t + \delta)$$

$$P_s(t) = V_s I_s [\cos(\delta) - \cos(4\omega_s t + \delta)] \qquad \text{[Equation 12]}$$

On the other hand, the output line harmonic voltage generator 815 may additionally apply a voltage command signal having the same size as that of the command voltage of the inverter unit 805 but having three times of the command voltage frequency to the command voltage of the inverter unit 805. Here, the output voltage, current and power of the inverter unit 805 may be expressed as illustrated in Equation 13.

$$v_0(t) = \sqrt{2} V_0 \sin(\omega_o t) + \sqrt{2} V_0 \sin(3\omega_o t + 2\phi)$$

$$i_0(t) = \sqrt{2} I_0 \sin(\omega_o t + \phi)$$

$$P_o(t) = V_0 I_0 [\cos(\phi) - \cos(4\omega_o t + 3\phi)] \qquad \text{[Equation 13]}$$

Furthermore, from the power equation in Equation 12 and the power equation in Equation 13, pulsating power applied to the capacitor unit 804 at the DC output line of the converter unit 803 is calculated below as illustrated in Equation 14.

$$P_c(t) = P_s(t) - P_o(t) = V_s I_s \cos(4\omega_s t + \delta) - V_0 I_0 \cos(4\omega_o t + 3\phi) \qquad \text{[Equation 14]}$$

As shown in Equation 14, it is seen that the AC component frequency of the input and output power is increased compared to the prior art in comparison with Equations 7 and 9.

Accordingly, a voltage command calculated through the input line harmonic voltage generator 814 and output line harmonic voltage generator 815 is added to the voltage command of each converter and inverter and thus it is seen that the above result is shown. When compared to Equation 10 which is pulsating power shown at the DC line capacitor of a power circuit in the related art, it is seen that the DC line frequency is increased by twice.

An electrolytic capacitor used at the DC line may be reduced in the size of impedance in a region less than several kHz. For example, the input line frequency of a power circuit is 50/60 Hz, and the output line frequency may be less than 200 Hz. In this case, when the output is formed as illustrated in the foregoing Equation 14, the impedance of a DC line capacitor on the pulsating frequency may be reduced as increasing the frequency.

Accordingly, due to the characteristic of the DC line capacitor, it may cause an effect of reducing the pulsating size of the DC line power voltage as increasing the frequency of pulsating power. As a result, it may be possible to reduce the pulsating size of the DC line power voltage in a situation requiring the same load power and having the same DC line capacitor, and have an effect capable of reducing the cost and volume as decreasing the required size of the capacitor.

Figure 11:
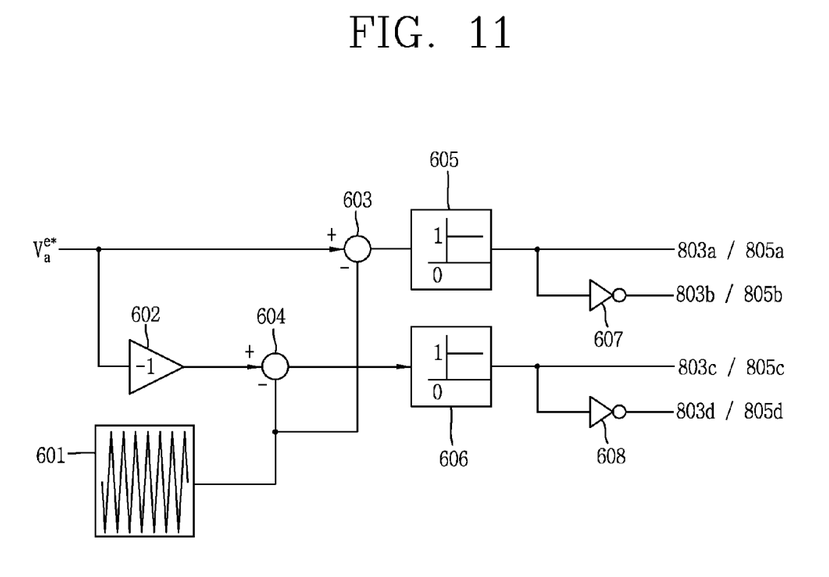
FIG. 11 is a control diagram for explaining a gate signal generation operation in an inverter device according to an embodiment of the present invention.

On the other hand, FIG. 11 is a view for explaining the configuration of the converter gate signal generator 810 and inverter gate signal generator 811 according to an embodiment of the present invention.

Prior to the description thereof, the converter gate signal generator 810 and inverter gate signal generator 811 may include the same circuit. The converter gate signal generator 810 and inverter gate signal generator 811 may be operated in the same unipolar switching method, for example. Accordingly, the operation of the converter gate signal generator 810 will be primarily described below, but it may be also applicable to the operation of the inverter gate signal generator 811 in the same manner.

The converter gate signal generator 810 may include a triangular waveform generator 601, an inverting unit 602, a third subtractor 603, a fourth subtractor 604, a first gate signal generator 605, a second gate signal generator 606, a first NOT gate 607, and a second NOT gate 608.

The triangular waveform generator 601 generates a triangular waveform signal for comparing with the DC line voltage command signal (Va*), and outputs it to the third subtractor 603 and fourth subtractor 604.

The inverting unit 602 receives the DC line voltage command signal (Va*) to output its inverted voltage.

The third subtractor 603 receives the DC line voltage command signal, and performs a difference operation from the output of the triangular waveform generator 601, and outputs a signal having a positive value or negative value to the first gate signal generator 605.

The fourth subtractor 604 receives an inverted voltage from the inverting unit 602, and performs a difference operation from the output of the triangular waveform generator 601, and outputs a signal having a positive value or negative value to the second gate signal generator 606.

The first gate signal generator 605 determines a switch status value according to the output of the third subtractor 603, and outputs it to the switch 803a of the converter unit 803 (switch 805a in case of the inverter), and outputs the inverted status value to the switch 803b of the converter unit 803 (switch 805b in case of the inverter) through the NOT gate 607.

Furthermore, the second gate signal generator 606 determines a switch status value according to the output of the fourth subtractor 604, and outputs it to the switch 803c of the converter unit 803 (switch 805c in case of the inverter), and outputs the inverted status value to the switch 803d of the converter unit 803 (switch 805d in case of the inverter) through the NOT gate 607.

According to the gate signal generation operation for switching each gate within a circuit due to the input line harmonic voltage generator 814 and output line harmonic voltage generator 815, the input line frequency and output line frequency of the converter unit 803 may be increased. Accordingly, it may be possible to implement an effect of reducing the pulsating size of the foregoing DC line power voltage through a circuit.

While the invention has been shown and described with respect to preferred embodiments of the present invention, it will be of course understood by those skilled in the art that various modifications may be made without departing from the gist of the invention as defined in the following claims, and it is to be noted that those modifications should not be understood individually from the technical concept and prospect of the present invention.

What is claimed is:

1. A regenerative inverter device, comprising:
   a converter unit configured to receive single phase AC power to output DC power;
   a capacitor unit configured to absorb DC power being output from the converter unit;
   an inverter unit configured to synthesize the absorbed DC power to output the drive power of a load; and
   a converter controller configured to control the converter unit based on the single phase AC power and the output DC power of the converter unit,
   wherein the converter controller comprises:
   a converter gate signal generator configured to control a plurality of gates contained in the converter unit; and
   an input line harmonic voltage generator configured to output converter additional power having a predetermined multiple of the frequency of the fundamental frequency component of the single phase AC power with the same size as that of the fundamental frequency component of the single phase AC power to an adder connected to the input side of the converter gate signal generator.

2. The regenerative inverter device of claim 1, wherein the converter controller comprises:
   a phase detection unit configured to detect the phase information of the single phase AC power;
   a coordinate conversion unit configured to convert a current of the single phase AC power to a d-axis current and a q-axis current according to the dq synchronous coordinate system based on the detected phase information;
   a voltage controller configured to generate a d-axis control current and a q-axis control current according to the output voltage of the converter unit; and
   a current controller configured to generate a first control voltage for controlling the converter unit according to the coordinate converted d-axis current and q-axis current and the d-axis control current and q-axis control current being output from the voltage controller,
   wherein the input line harmonic voltage generator outputs a second control voltage based on the single phase AC power and the first control voltage, and
   the adder adds the first control voltage and the second control voltage to output it to the converter gate signal generator.

3. The regenerative inverter device of claim 2, wherein the input line harmonic voltage generator comprises:
   a subtractor configured to output a difference between the first control voltage and the single phase power voltage;
   an absolute value computing unit configured to calculate an absolute value of the subtractor output to compute the size of the fundamental frequency component;
   a proportional controller configured to output a predetermined size of the harmonic voltage based on the computed size of the fundamental frequency component; and
   a phase determination unit configured to control a phase such that a harmonic voltage being output from the proportional controller becomes the predetermined multiple of the fundamental frequency to output the second control voltage.

4. The regenerative inverter device of claim 1, wherein the input line harmonic voltage generator comprises a proportional controller for maintaining the voltage size and frequency of the converter additional power at the predetermined multiple.

5. The regenerative inverter device of claim 1, wherein the predetermined multiple is 3 times.

6. The regenerative inverter device of claim 1, further comprising:
an inverter controller configured to control the inverter unit based on the output voltage of the inverter unit,
wherein the inverter controller comprises:
an inverter gate signal generator configured to control a plurality of gates contained in the inverter unit; and
an output line harmonic voltage generator configured to output inverter additional power having a predetermined multiple of the frequency of the fundamental frequency component of the output voltage of the inverter unit with the same size as that of the fundamental frequency component of the output voltage of the inverter unit to an adder connected to the input side of the inverter gate signal generator.

7. The regenerative inverter device of claim 6, wherein a predetermined multiple of the fundamental frequency component of the single phase AC power of the converter additional power frequency is the same as that of the fundamental frequency component of the output voltage of the inverter unit of the inverter additional power frequency.

8. The regenerative inverter device of claim 6, wherein the output line harmonic voltage generator comprises:
an absolute value computing unit configured to compute a fundamental frequency component size of the output voltage of the inverter unit; and
a phase determination unit configured to output the inverter additional power through phase control based on a load angle of the output voltage of the inverter unit and a fundamental frequency component size of the output voltage of the inverter unit.

9. An inverter device comprising a plurality of unit power cells, the inverter device comprising:
a phase replacement transformer unit configured to receive 3-phase power from input power to perform phase replacement, and provide single phase power to the each unit power cell; and
an output line configured to synthesize power being output from the each unit power cell to output it to a 3-phase drive load,
wherein the each unit power cell comprises:
a converter unit configured to receive the single phase power to output DC power;
an inverter unit configured to output the DC power to the output line;
a converter controller configured to control the converter unit based on the single phase power and the output power of the converter unit; and
an inverter controller configured to control the inverter unit based on the output voltage of the inverter unit,
wherein the converter controller comprises an input line harmonic voltage generator configured to output converter additional power having a predetermined multiple of the frequency of the fundamental frequency component of the single phase AC power with the same size as that of the fundamental frequency component of the single phase power, and
the inverter controller comprises an output line harmonic voltage generator configured to output inverter additional power having a predetermined multiple of the frequency of the fundamental frequency component of the output voltage with the same size as that of the fundamental frequency component of the output voltage.

10. The inverter device of claim 9, wherein the each unit power cell uses a unit power cell divided into a predetermined group corresponding to each phase of the 3-phase drive load to be connected to the output line.

11. The inverter device of claim 10, wherein the phase voltage of the 3-phase drive load uses a unit power cell synthesized into the voltage sum of unit cells divided into the predetermined group.

12. The inverter device of claim 9, wherein the inverter unit and the converter unit contained in the each unit power cell uses a unit power cell connected in a series H-bridge structure.

13. The inverter device of claim 9, wherein the 3-phase drive load uses a unit power cell containing at least one of an induction motor and a synchronous motor.

* * * * *